Sept. 5, 1950          C. A. THOMAS          2,521,551
DYNAMOELECTRIC MACHINE COMMUTATION
Filed March 19, 1948
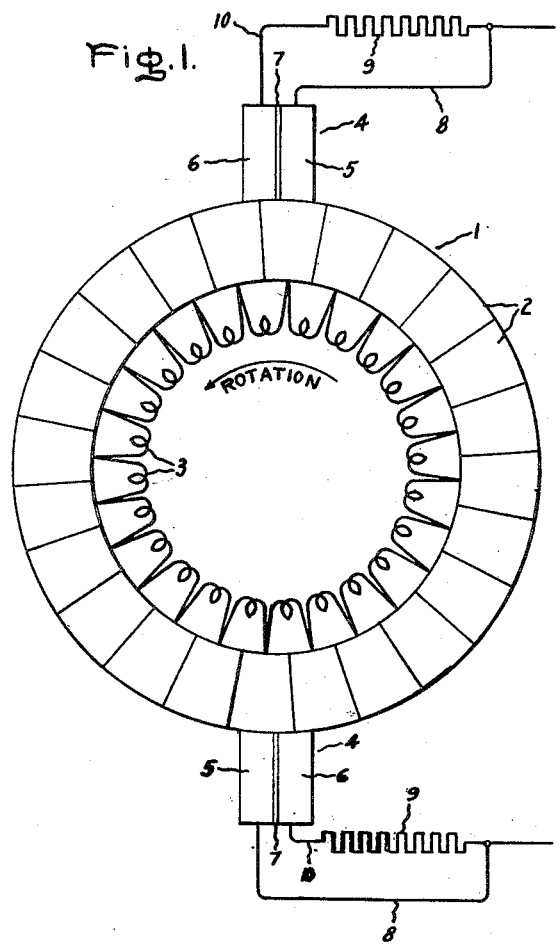
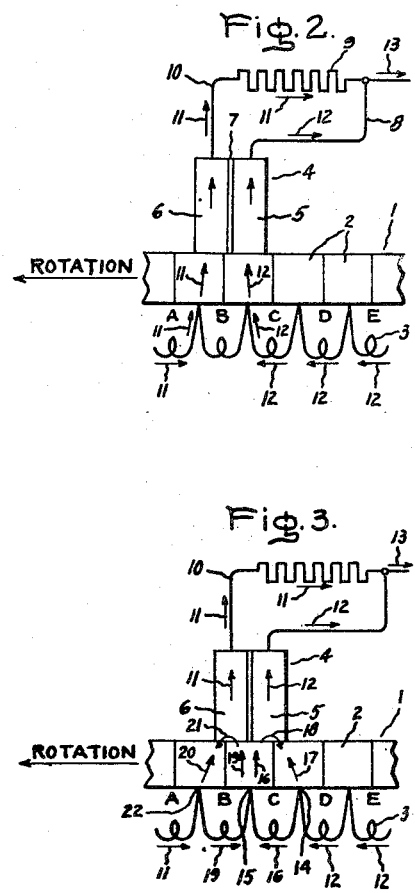
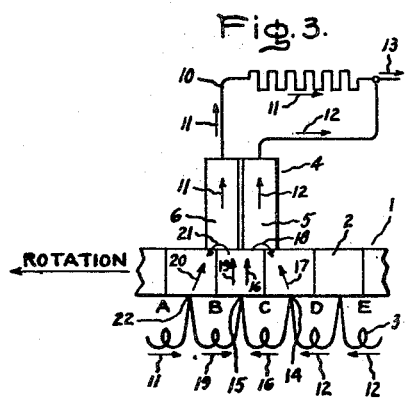
Inventor:
Charles A. Thomas,
by    *Prowell S. Mack*
His Attorney.

Patented Sept. 5, 1950

2,521,551

UNITED STATES PATENT OFFICE 2,521,551

DYNAMOELECTRIC MACHINE COMMUTATION

Charles A. Thomas, Fort Wayne, Ind., assignor to General Electric Company, a corporation of New York Application March 19, 1948, Serial No. 15,782

7 Claims. (Cl. 171—228)

This invention relates to commutating type dynamoelectric machines and more particularly to such machines having means arranged to provide a commutating voltage to improve commutation and reduce sparking.

It is well known that the current flowing in each armature coil of a commutating type dynamoelectric machine must necessarily reverse itself as to the coil passes from one side of the brush to the other during commutation. In ideal commutation, the current in each coil should decrease at a uniform rate and reach a zero value at a point corresponding to the middle of the brush. The current should then increase at a uniform rate and reach its normal value in the opposite direction by the time the coil passes from under the brush. However, this ideal commutation is ordinarily unobtainable due to the fact that each armature coil, being imbedded in slots in the iron of the armature core, has considerable inductance. Therefore, the coil undergoing commutation has induced in it a voltage of self-induction or a reactance voltage due to the changing current in the coil. This reactance voltage is always in a direction to oppose the change of current and thus proper commutation will not be secured and sparking may result since the current in the coil may not have reached the correct value by the time the coil passes from under the brush. It is, therefore, desirable in the design of commutating type dynamoelectric machines to provide a voltage in the coil undergoing commutation which is opposite to and which will, as nearly as possible, neutralize the reactance voltage during commutation thus insuring that the current in the coil has reached the correct value when the coil leaves the brush. In the past, such a voltage has been produced by shifting the brushes until the coil undergoing commutation comes under a fringe of the main field flux thus providing a generated voltage in the coil of the proper direction and value to neutralize the reactance voltage; or by providing a special commutating field of the right direction and value by the means of commutating poles or compensating windings.

It is an object of this invention to provide improved means for securing good commutation in commutator type dynamoelectric machines.

Another object of this invention is to provide improved means for reducing brush sparking in commutating type dynamoelectric machines.

A further object of this invention is to provide means for improving commutation and reducing brush sparking in commutating type dynamoelectric machines without the necessity of shifting brushes or providing commutating poles.

Further objects and advantages of this invention will become apparent and the invention will be better understood from the following description referring to the accompanying drawing. The features of novelty which characterize this invention will be pointed out with particularity in the claims annexed to and forming a part of this specification.

In the drawing, Fig. 1 illustrates schematically the improved split brush and resistor arrangement of this invention for providing a commutating voltage and Figs. 2 through 6 illustrate schematically the successive stages of commutation of the device of Fig. 1 as the commutator moves past the brush.

In accordance with this invention, there is provided a contact brush having two segments electrically insulated from each other. One segment is connected directly to the circuit of the dynamoelectric machine, while a resistor is arranged in series with the other segment. The voltage drop in this resistor responsive to the flow of load current in its associated brush segment may be arranged by proper proportioning of the resistor to substantially neutralize the reactive voltage of the coil undergoing commutation. Therefore, the reversal of the current in each coil as it passes from one side of the brush to the other is facilitated and sparking reduced.

Referring now to Fig. 1, there is shown schematically a commutator 1 of a commutating type dynamoelectric machine having a plurality of commutator bars 2. A plurality of armature coils 3 are connected to the commutator bars 2 and arranged in the armature slots in any convenient manner. In the two pole arrangement shown, there are provided two commutator brushes 4 having leading and trailing segments 5 and 6 respectively abutting the commutator surface. The two brush segments 5 and 6 are electrically insulated from each other by insulating material 7. The leading brush segments 5 are directly connected in the circuit of the dynamoelectric machine by brush leads 8. Resistors 9 interposed in series with the leads 10 of the trailing brush segments 6 connect these segments to the leading brush leads 8. Since both brush segments are arranged to carry load current, it will be readily apparent that a voltage drop will be produced in the resistors 9. This voltage drop, which is responsive to the load current in the trailing brush segment 6, may be made by proper proportioning of the resistors 9 to substantially neutralize the reactive voltage across the armature coil undergoing commutation.

Reference to Figs. 2 through 6, which show a commutation cycle and in which like parts are indicated by like numerals, will explain the operation of this invention. Referring now to Fig. 2, there is shown an initial position of the brush 4 with respect to the commutator 1 and rotation of the commutator is assumed in the direction of the arrow. A group of five armature coils 3 is shown designated by letters A through E. Since there are two paths for the load current to flow through the armature, load current will flow in the coil A as shown by the arrow 11 and in coils C, D and E, as shown by the arrow 12. It can be readily seen that current 11 will flow through the commutator bar under the brush segment 6, through the brush segment 5, the lead 10 and the resistor 9. The current 12 likewise flows through the commutator bar under the brush segment 5, through the brush segment 5 and the lead 8. The currents 11 and 12 then combine to form the total load current 13.

Referring now to Fig. 3, the commutator is shown as having moved approximately one-half a width of a commutator bar. The current 11 is still flowing in the same direction in coil A and the current 12 is still flowing in the same direction in coils D and E. Now, however, coils B and C are short circuited by brush segments 6 and 5 respectively. Considering now only coil C, there is now provided two parallel paths for the current 12 to reach the brush 4, i. e., through coil connection 14 and coil connection 15. Therefore, only a portion of the current 12 will continue to flow in the coil C, as indicated by the arrow 16, the remaining portion of the current, as indicated by the arrow 17, flowing through the coil connection 14. The currents 16 and 17 would be approximately equal in value if it were not for the fact that the coil C is short circuited by the brush 5 and, therefore, a short circuit current 18 will flow as indicated by the arrow. The current 17 will, therefore, be reduced by the amount of this short circuit current and the current 16 will be increased by the same amount. The same condition is, of course, obtained in coil B with the current 11 being divided into components 19 and 20 flowing through coil connections 15 and 22 respectively, current 20 being reduced by the amount of short circuit current 21 while current 19 is increased by a corresponding amount. Assuming a position as shown, with the split in the brush 4 in the center of a commutator bar, the current will again divide approximately equally through the brush segments 5 and 6.

It would be expected that as the commutator 1 continues to move in the direction shown, current 17 would increase and current 16 decrease until a point would be reached, as shown in Fig. 4, where the current 17 would equal current 12 and current 16 would be reduced to zero due to the short circuiting of the coil C. However, these armature coils being imbedded in the iron of the armature have inductance. The change in the value of the current in the coil as the commutator moves past the brush produces, in accordance with well known principles, a reactive voltage which is in a direction which tends to maintain the flow of current.

Referring now to Fig. 4, the commutator 1 is shown as having moved another half commutator bar pitch so that the insulation 7 of the brush 4 is positioned directly over a commutator slot so that no armature coil is short circuited except through resistor 9. It will be noted that current 11 is flowing in coils A and B and current 12 in coils D and E. It would be expected that no current would now be flowing in coil C at this point and that all of current 12 would be flowing through coil connection 14, the voltage drop across the coil C having been dissipated by the short circuit current 18. However, as pointed out above, the change in the value of the current, in this case a reduction in the value caused by the movement of the commutator along the brush, has produced a reactive voltage as indicated by the arrow 23. This reactive voltage tends to maintain a flow of current in coil C in the same direction as current 12. If a conventional brush were used, this current might not be completely dissipated by the time coil C has passed out from under the brush, as shown in Fig. 6, in which case sparking would result. However, with the split brush construction of this invention with the brush segments 5 and 6 insulated by insulation 7, in the position of Fig. 4, all of the current 11 will flow through the trailing segment 6, trailing lead 10, and resistor 9, while all of the current 12 will flow through the leading segment 5 and the lead 8. The current 11 flowing in the resistor 9 produces a voltage drop indicated by the arrow 24. It will be readily seen that this voltage drop is in a direction opposite to the reactive voltage 23 in coil C. By proper proportioning of the resistor 9, the voltage drop 24 responsive to the current 11 can be made to substantially neutralize the reactive voltage 23. Therefore, at this point, there will be no tendency for current to continue to flow in coil C in the direction of current 12.

Referring now to Fig. 5, it will be seen that current 11 is flowing in coils A and B and current 12 is flowing in coil E, the commutator having moved another half bar pitch. Coil C is now again short circuited by brush segment 6 alone and a portion of current 11 flows through coil connection 22, as indicated by the arrow 25 and another portion through the coil connection 15, as shown by the arrow 26. Therefore, current 26 is flowing in coil C, which it will be noted is in the opposite direction to current 12 which was flowing in coil C in the position of Fig. 2. Since, due to the effect of the split brush and resistor arrangement in the position of Fig. 4, the reactive voltage was neutralized at that point, there is now no tendency for current to flow in coil C in the direction of current 12. However, due to the increase of the current 26 caused by continual progression of the commutator 1 in the direction shown, a reactive voltage 27 is developed in the coil C which tends to oppose the increase of the current 26. This opposition however is overcome by voltage drop of resistor 9. Referring now to Fig. 6, the commutator has now moved so that the coil C is no longer short circuited by the brush segment 6. It will be noted that the commutation cycle of coil C is now completed and the full current 11 is flowing therein, the current flow in coil C having been completely reversed as it traveled across the brush.

From the foregoing, it will be readily apparent that this invention provides a simple and effective means for neutralizing the reactive voltage developed in an armature coil while undergoing commutation. Thus, by the utilization of this invention, the necessity for providing brush shifting arrangements or commutating poles is eliminated.

While I have illustrated and described a particular embodiment of this invention, modifications thereof will occur to those skilled in the art. I desire it to be understood, therefore, that this invention is not to be limited to the particular arrangement disclosed and I intend in the appended claims to cover all modifications which do not depart from the spirit and the scope of this invention.

What I claim as new and desire to secure by Letters Patent of the United States is:

1. In a dynamoelectric machine having a commutator, consisting of a plurality of commutator bars with each of said bars having an armature coil connected thereto, a commutator brush having a plurality of segments of conductive material abutting said commutator, said segments being insulated from each other and having substantially the same resistance, means for connecting one of said segments directly in the circuit of said dynamoelectric machine, and resistance means having a substantially linear voltage-current characteristic connecting another of said segments to said first named connecting means for producing responsive to the current in said other segment a commutating voltage opposed to the reactance voltage across the armature coil short-circuited by said brush whereby said reactance voltage is neutralized and the reversal of current in said coil is facilitated.

2. In a dynamoelectric machine having a commutator consisting of a plurality of commutator bars with each of said bars having an armature coil connected thereto, a commutator brush having two segments of conductive material abutting said commutator, said segments being insulated from each other and having substantially the same resistance, a lead for connecting one of said segments directly in the circuit of said dynamoelectric machine, and a resistor having a substantially linear voltage-current characteristic connecting the other of said segments to said lead for producing responsive to the current in said other segment a commutating voltage drop opposed to the reactance voltage across the armature coil short-circuited by said brush whereby said reactance voltage is neutralized and the reversal of current in said coil is facilitated.

3. In a dynamoelectric machine having a commutator consisting of a plurality of commutator bars with each of said bars having an armature coil connected thereto, a commutator brush having two segments of conductive material abutting said commutator and having substantially the same resistance, said segments being insulated from each other, a lead for connecting the leading brush segment directly in the circuit of said dynamoelectric machine, and a resistor having a substantially linear voltage-current characteristic connecting the trailing brush segment to said lead for producing responsive to the current in said trailing segment a commutating voltage drop opposed to the reactance voltage across the armature coil short-circuited by said brush whereby said reactance voltage is neutralized and the reversal of current in said coil is facilitated.

4. In a dynamoelectric machine having a commutator consisting of a plurality of commutator bars with each of said bars having an armature coil connected thereto, a commutator brush having two segments of conductive material abutting said commutator and having substantially the same resistance, insulation means for separating said segments, a lead for connecting one of said segments directly in the circuit of said dynamoelectrical machine, and a resistor having a substantially linear voltage-current characteristic connecting the other of said segments to said lead for producing responsive to the current in said other segment a commutating voltage drop opposed to the reactance voltage across the armature coil short-circuited by said brush whereby said reactance voltage is neutralized and the reversal of current in said coil is facilitated.

5. In a dynamoelectric machine having a commutator consisting of a plurality of commutator bars with each of said bars having an armature coil connected thereto, a commutator brush having two segments of conductive material abutting said commutator and having substantially the same resistance, insulation means for separating said segments, a lead for connecting the leading brush segment directly in the circuit of said dynamoelectric machine, and a resistor having a substantially linear voltage-current characteristic connecting the trailing brush segment to said lead for producing responsive to the current in said trailing segment a commutating voltage drop opposed to the reactance voltage across the armature coil short-circuited by said brush whereby said reactance voltage is neutralized and the reversal of current in said coil is facilitated.

6. In a dynamoelectric machine having a commutator consisting of a plurality of commutator bars with each of said bars having an armature coil connected thereto, a commutator brush having two segments of conductive material abutting said commutator and having substantially the same resistance, insulation means for separating said segments, leads for connecting said segments in the circuit of said dynamoelectric machine, and a resistor having a substantially linear voltage-current characteristic interposed in series relationship with one of said leads and its associated brush segment for producing responsive to the current in said one lead a commutating voltage drop opposed to the reactance voltage across the armature coil short-circuited by said brush whereby said reactance voltage is neutralized and the reversal of current in said coil is facilitated.

7. In a dynamoelectric machine having a commutator consisting of a plurality of commutator bars with each of said bars having an armature coil connected thereto, a commutator brush having two segments of conductive material abutting said commutator and having substantially the same resistance, insulation means for separating said segments, leads connecting the leading and trailing brush segments in the circuit of said dynamoelectric machine, and a resistor having a substantially linear voltage-current characteristic interposed in series with the trailing brush lead and trailing brush segment for producing responsive to the current in said trailing brush segment lead a commutating voltage drop opposed to the reactance voltage across the armature coil short-circuited by said brush whereby said reactance voltage is neutralized and the reversal of curent in said coil is facilitated.

CHARLES A. THOMAS.

REFERENCES CITED

The following references are of record in the file of this patent:

UNITED STATES PATENTS

| Number | Name | Date |
|---|---|---|
| 1,059,134 | Fornander | Apr. 15, 1913 |
| 1,884,021 | Ludwig et al. | Oct. 25, 1932 |
| 2,152,327 | Rauhut | Mar. 28, 1939 |